United States Patent [19]

Kafchinski et al.

[11] Patent Number: 4,910,106
[45] Date of Patent: Mar. 20, 1990

[54] FORMATION OF HALOGENATED POLYMERIC MICROPOROUS MEMBRANES HAVING IMPROVED STRENGTH PROPERTIES

[75] Inventors: Edward R. Kafchinski, Winfield; Herman L. LaNieve, III, Warren; Gordon W. Calundann, North Plainfield; Tai-Shung Chung, Randolph, all of N.J.

[73] Assignee: Hoechst Celanese Corporation, Somerville, N.J.

[21] Appl. No.: 228,883

[22] Filed: Aug. 5, 1988

[51] Int. Cl.$^4$ .............................................. H01M 2/16
[52] U.S. Cl. ..................................... 429/254; 264/49
[58] Field of Search ........................................ 429/254

[56] References Cited

U.S. PATENT DOCUMENTS

| | | | |
|---|---|---|---|
| 2,806,256 | 9/1957 | Smith-Johannsen | 18/57 |
| 3,123,654 | 3/1964 | Malischewski | 429/254 |
| 3,354,247 | 11/1967 | Zehender et al. | 429/254 |
| 3,407,249 | 10/1968 | Landi | 264/49 |
| 3,929,950 | 12/1975 | Nakamura | 264/49 |
| 3,973,398 | 2/1961 | Hubbard et al. | 429/254 |
| 4,629,666 | 12/1986 | Schlaikjer | 429/254 |

Primary Examiner—Donald L. Walton
Attorney, Agent, or Firm—Lynch, Cox, Gilman & Mahan

[57] ABSTRACT

Disclosed herein is a process for producing a polyhalogenated microporous film having a very narrow pore size distribution and good temperature and chemical resistance. The process involves blending a polyhalogenated copolymer having a very small particle size with a binder polymer utilizing a solvent which is a nonsolvent for the polyhalogenated copolymer but a solvent for the binder polymer, forming a film from the blend, drying the film, heating the film to a temperature at or above the melting point of the polyhalogenated copolymer and under conditions such that the microparticulate particles at their points of mutual contact will neck together to form a relatively continuous matrix and extracting the binder polymer from the film utilizing a solvent for the binder particle to form a microporous film.

15 Claims, 2 Drawing Sheets

FORMATION OF HALOGENATED POLYMERIC MICROPOROUS MEMBRANES HAVING IMPROVED STRENGTH PROPERTIES

BACKGROUND OF THE INVENTION

1. Field of Invention

This invention relates microporous, polyhalogenated, polymeric films. More particularly this invention relates to polyhalogenated, polymeric films, as described hereafter, which are prepared utilizing micro powders having particle sizes of less than about two microns.

2. Prior Art

Microporous films are used in a wide range of applications, generally to provide barriers which are selective to the passage of various materials such ions or molecules. For example, microporous films may be used as battery separators, ion-exchange membranes and electrolysis membranes, as well as in breathable fabrics and medical and packaging applications. Many prior art films have been formed from polyolefins which can be rendered microporous by the extraction of a soluble component or by other processes. Among the polymers which can conveniently be rendered microporous by these processes are included polyethylene and polypropylene. Films of these polymers, while chemically inert towards many acids, alkalis and reactive metals, are, none-the-less, incompatible with a number of solvents which are commonly used. Moreover, the maximum operating temperature for polyolefins of this type is approximately 120° C. As a result, these films cannot be employed where high temperature performance is necessary.

The preparation and use of porous, polyfluorinated, microporous films is known. For example, U.S. Pat. No. 3,407,249 discloses a porous polytetrafluoroethylene (Teflon) film useful as a battery separator. The patent describes the use of Teflon particles having diameters in the range of about 0.1 to 0.5 microns. According to the patent, these particles are mixed with a polymer such as polymethylmethacrylate, hot-milled and extruded. The polymethylmethacrylate polymer is then dissolved from the extruded film to produce a microporous product.

The microporous films prepared in the '249 patent are significantly different from the films of the instant invention in that they are "extensively fibrillated", i.e., the pores of the films of the '249 patent are in reality slits or "cracks" in the film. Thus, the slit pores of the films of the '249 patent do not lend themselves to the uniform separation of ionic materials such as is necessary with battery separators. Moreover, the films prepared in the '249 patent are primarily based upon polytetrafluoroethylene films and do not possess the superior properties of the films prepared according to the instant invention.

U.S. Pat. No. 2,806,256 discloses the preparation of battery separators based on polytetrafluoroethylene and polytrifluoromonochloroethylene polymers. There is no disclosure in this patent to the use of the specific polymers disclosed as useful herein.

Other prior art, microporous, polyfluorinated polymers, like the materials described in the '249 patent, have suffered from a lack of uniform pore size distribution. While the films of the instant invention offer a pore size distribution of about 0.1 to 1 microns, the pore size distribution shown in prior ar films is not nearly as narrow nor are the pores as small; the average pore diameter range of many prior film ranging from about 1 to 5 microns. Another important characteristic resent in the films of the instant invention, but found lacking in prior art films, is transverse direction, tensile strength. Prior art membranes have generally been extremely weak in the transverse direction due either to their highly fibrillated or highly drawn nature.

U.S. Pat. No. 3,929,950 discloses the formation of porous synthetic films based upon ethylene/tetrafluoroethylene copolymers (ETFE). In the '950 patent another polymer such as polypropylene is blended into the polymer melt and then dissolved out again, after film formation, to produce a microporous film. However, the '950 patent does not disclose the particle size of the ETFE copolymer which is utilized. Also, because of the extensive stretching required, the films described in this patent are anisotropic, highly oriented and accordingly have relatively wide, non-uniform pores. The films of the instant invention, on the other hand, exhibit a very narrow pore size distribution and, at the same time, the films are not anisotropic in nature.

Other patents which disclose polyfluorinated microporous films include U.S. Pat. Nos. 4,702,836, 3,661,645, 3,679,614, 4,623,670 and 4,342,636.

Other prior art process have used ionic materials, particularly lithium salts in rendering polyhalogenated films microporous. However, the presence of even trace amounts of these ionic salts in certain end uses for microporous films such as battery separators may be deleterious. Moreover, many lithium salts are hygroscopic and therefore tend to undesirably attract and hold water within films prepared utilizing these salts. As a result, dielectric breakdown of battery separators made from microporous films based upon lithium salts may occur. Films of the instant invention, on the other hand, are not prepared based upon ionic salts and accordingly do not suffer from the disadvantages demonstrated by many prior art polyhalogenated microporous films.

Accordingly, it is an object of this invention to prepare microporous films having relativity uniform pore sizes.

It is another object of this invention to prepare polyhalogenated microporous films having relatively small pore diameters.

It is another object of the instant invention to prepare essentially ion free films which do not contain residues of ionic salts.

It is also an object of this invention to prepare microporous polyhalogenated films having improved transverse direction strength when compared to prior art, polyhalogenated, microporous films.

It is also an object of this invention to prepare microporous films which are not highly oriented and which are based upon polyhalogenated copolymers.

It is yet another object of this invention to prepare films which are useful in high temperature applications and are substantially inert to chemically aggressive substances such as alkali and alkaline earth metals.

These and other objectives are obtained by preparing the compositions of the instant invention utilizing the process described below.

SUMMARY OF THE INVENTION

The instant invention involves microporous polymeric films which are comprised of a polyhalocopolymer in which the repeating units are —$(C_aH_{2a})$— and —$(C_bX_{2b})$—, wherein each X independently represents fluorine or chlorine and the value of a is 1-6 and b is 1-6. The film prepared from this copolymer have a porosity up to about 65 percent and having pore sizes of from about 0.1 to about five microns.

The films of the instant invention are prepared by a novel process which comprises forming a suspension of the polyhalocopolymers of the instant invention utilizing micropowders having a particle size of less than about 2.0 microns, mixing the suspension with a polymeric binder solution, forming a film from said mixture, evaporating the solvent from the mixture, uniformly heating the resulting film to irreversibly agglomerate a portion of the polyhalocopolymers, and treating the heated film with a solvent for the binder polymer to extract the binder polymer and render the film microporous.

The resulting microporous film is useful in a wide variety of applications including as a battery separator. As such this film exhibits good chemical stability, provides pores of uniform but small size, possesses excellent transverse direction strength, and is essentially on-free in character.

DETAILED DESCRIPTIONS OF PHOTOGRAPHS

Figure 1:
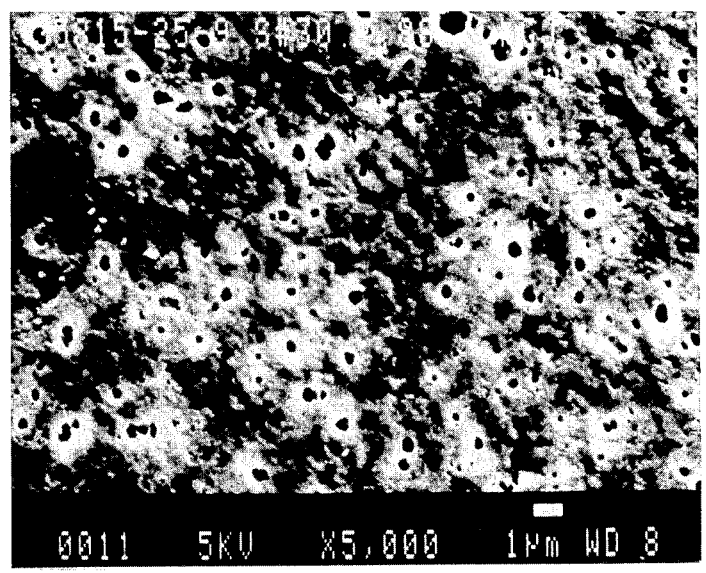
FIGS. 1 and 3 are photographs of the instant invention microporous film.
Figure 2:
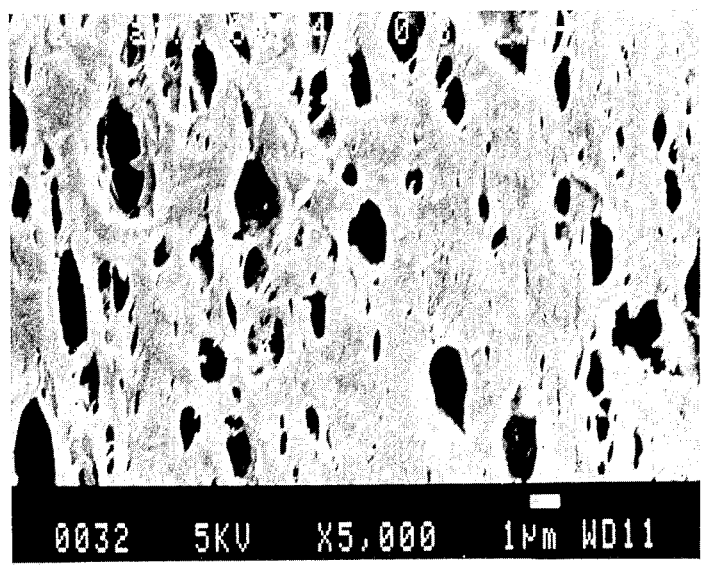
FIGS. 2 and 4 are photographs of microporous film of the prior art.
Figure 3:
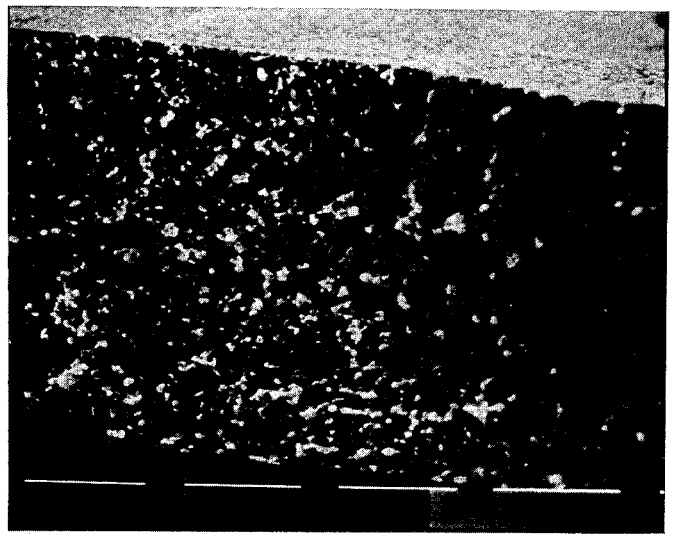
Figure 4:
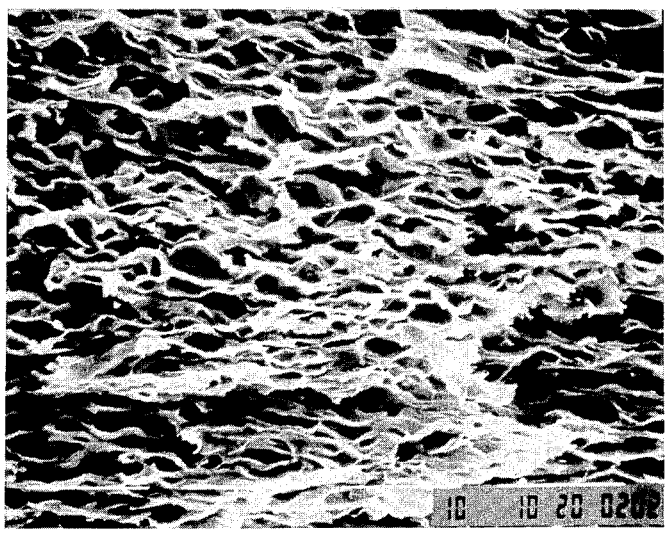

The photographs which are FIGS. 1-4, compare an example of the microporous film of the instant invention shown in FIGS. 1 and 3 with corresponding examples of a prior art microporous film shown in FIG. 2 and 4. FIGS. 1 and 2 show a top view of a sample of the film of the instant invention (FIG. 1) and a prior art film (FIG. 2). Both photographs are made by a scanning electron microscope at 5000 magnification. FIGS. 3 and 4 are examples of an end or side view of the same microporous films with FIG. 3 showing the instant invention while a prior art film is shown in FIG. 4. Each of the photographs in FIGS. 3 and 4 was made by scanning electron microscope at 2000 magnification.

As can been seen from a review of the photographs showing the prior art in FIGS. 2 and 4, it is clear that the prior art film includes a relatively wide variety of pore types and sides, all of which are much larger and more irregular than are the pores of the films of the instant invention as shown in FIGS. 1 and 3. The films of the instant invention, as readily can be seen, on the other hand, exhibit relatively uniform, small pore diameters. In addition, most of the pores in the FIG. 1 electron micrographs are of relatively round shape as compared to the slit shape of the prior art film pores shown in FIG. 2. Thus, the films shown in FIGS. 1 and 3 are fundamentally different from the films shown in FIGS. 2 and 4.

DETAILED DESCRIPTION OF INVENTION

The first polymer of the instant invention is a polyhalocopolymer in which the repeating units are $-(C_a H_{2a})-$ and $-(C_b X_{2b})-$ wherein each X, independently, represents fluorine or chlorine and wherein the value of a is 1-6 and b is 1-6.

Preferably the first polymer of the instant invention is selected from the group consisting of ethylene/tetrafluoroethylene copolymers, ethylene/chlorotrifluoroethylene copolymers and mixtures thereof. These polymers and copolymers all posses excellent chemical and thermal resistance and exhibit improved mechanical properties when used as the microporous films of the instant invention.

The ethylene/tetrafluoroethylene copolymer is a copolymer in which ehylene and tetrafluoroethylene, principally are combined alternatively. The melting points of these copolymers vary, depending upon the compositional proportion of ethylene to tetrafluoroethylene, from about 200° C. to about 280° C. Those copolymers having the highest melting points are more preferred than those having lower melting points. Commercially available products include Hostaflon ® materials produced by Hoechst, Inc.

The ethylene/chlorotrifluoroethylene copolymer is a copolymer wherein ethylene and chlorotrifluoroethylene, principally, are combined alternately. The melting points of these copolymers also vary according to the proportion of ethylene to chlorotrifluoroethylene moieties and may range from about 200° to 260° C. Again the polymers having the higher melting points are preferred. Commercially available products of this type include those such as Halar ® produced by Allied Chemical Corporation.

Regardless of which of the polyhalogenated polymers or copolymers (hereafter the polymers and copolymers are referred to jointly as "copolymers") is chosen herein, the copolymer should have a number average molecular weight of at least about 10,000, preferably at least about 50,000. Furthermore it is essential that the copolymers which are utilized be employed in their microparticulate form with particle size diameters, on the average, of no greater than about 2.0 microns, preferably less than about 1.0 microns and most preferably less than about 0.5 microns.

Finally, in most cases the polyhalogenated copolymers of the instant invention are obtained commercially in the form of either a microparticulate powder, as described above, or an the form of a surfactant stabilized, dispersion of the above microparticles in a nonsolvent for the polyhalogenated copolymer, such as water. In the later case, in order to form the microporous films of the instant invention, it is preferred that any surfactant or dispersant be removed and that the nonsolvent in which the polyhalogenated copolymer is dispersed be a solvent for the second or binder polymer. Accordingly, if the polyhalogenated copolymer is supplied in a solvent in which the binder polymer is not soluble, then both the solvent in which the polyhalogenated copolymer is supplied and the surfactant should be removed and the solvent replaced with a solvent, such as methylene chloride, for example, which would dissolve the binder polymer. While it is preferred to remove the surfactant at this point in the processing, in order to prepare the films of the instant invention, surfactant removal at this point is not absolutely necessary. For example, if the surfactant is soluble in the solvent that is used to extract the binder polymer as described hereafter, then the surfactant removal step may be combined with the binder polymer extraction step.

The second or binder polymer of the instant invention is a polymer which is immiscible, in the melt phase, with the polyhalogenated copolymer. If the binder polymer and the polyhalogenated polymer are miscible, i.e., if the binder polymer actually becomes solubilized in the first polymer, in he melt phase, such that the microparticulate nature of the polyhalogenated copolymer dispersion is destroyed, then it will be impossible to form a microporous film of the type described herein.

Finally, the polyhalogenated copolymer and the binder polymer must not have the same solvent solubility characteristics. That is, it is necessary that there be at least one solvent for the binder polymer in which the polyhalogenated copolymer is insoluble, but dispersible.

Examples of polymers which may be useful as the binder polymers of this invention include polycarbonates such as Makrolon ® (formerly Merlon) which is available from the Mobay Corporation, polyarylates, polysulfones, polymethylmeyhacrylates and other similar polymers which meet the requirements described above.

FILM FABRICATION

The polyhalogenated copolymers of the instant invention which are utilized to form the microporous films described herein, as pointed out above, are usually obtained in the form of a dispersion, generally an aqueous dispersion. Usually these dispersions are furnished at about the 12 to 20 percent slides weight level and are stabilized utilizing various surfactants such as ammoniumperfluoroctanoate and ammoniumoxalate and manganeseacetate. However, in order to utilize these dispersions in the process of the instant invention, it is necessary to remove the surfactant by washing the dispersion repeatedly with a solvent for the surfactant. It may also be necessary to remove the water or other solvent in which the polyhalogenated copolymer is dispersed depending upon the solubility of the binder polymer in the dispersing solvent. If the binder polymer is insoluble in the dispersing solvent then the dispersing solvent must be replaced with another solvent in which the polyhalogenated copolymer is dispersible but in which the binder polymer is soluble. For example, when a polycarbonate is used as the binder polymer and ethylene-/tetrafluoroethylene (ETFE) is used as the polyhalogenated copolymer, the polyhalogenated copolymer aqueous dispersion is initially treated with acetone which removes the surfactant and, at the same time, precipitates the polyhalogenated copolymer from the aqueous dispersion. After filtration and repeated washing with acetone, t polyhalogenated copolymer can then be temporarily dispersed in methylene chloride at approximately the 10 to 50 percent by weight solids level. Since polycarbonate polymers are generally soluble in methylene chloride, the methylene chloride dispersion of the ETFE may then be used in conjunction with a methylene chloride solution of the polycarbonate.

The amount of the binder polymer which is added to the polyhalogenated copolymer, on a solids basis, should range from about 25 percent to about 65 percent, preferably, about 30 to about 50 percent by weight, the total of the two mixed polymers on a solids basis being 100 percent. Below the 20 percent binder polymer level, after film formation and solvent evaporation, flakey films are produced because sufficient binding of the polyhalogenated copolymer powder does not occur. At binder polymer levels of higher than about 65 percent, the films, after extraction with a solvent for the binder polymer, are too porous to permit use as described herein. The above weight percentages are based upon the use of the polycarbonate described in Example 1 which has a density of approximately 1.7. If another polymer is utilized which has a density which is greater or lesser than 1.7 then the above amounts must be adjusted to reflect the change in density. For example, if a polymer having a density of 1.5 is employed, then each of the percentages specified above should be decreased by 1.5/1.7 or approximately 88.2 percent.

The polyhalogenated copolymer suspension as prepared above and the binder polymer solution are mixed together under high shear and filtered under nitrogen at temperatures well below the melting point of either the binder polymer or the polyhalogenated copolymer. High shear mixing is believed to be necessary in order to ensure that the polyaalogenated copolymer is dispersed throughout the binder polymer. Adequate dispersion will ensure that most particles, preferably all particles, of the polyhalogenated copolymer are in contact with the binder polymer. If high shear mixing is carried out so as to adequately disperse the polyhalogenated copolymer within the binder polymer, then after film casting or extrusion and solvent vaporization the unheated film will maintain overall film integrity. Film integrity at this stage of the process is assured by the presence of adequate amounts of the binder polymer as described above. In the event the binder polymer and the polyhalogenated copolymer are not intimately dispersed, it is believed that the polyhalogenated copolymer microparticles which are separated from contact with the binder polymer cannot form a film having sufficient film integrity. High shear mixing is carried out using a Henshel mixer, a Banbury mixer, a Dispax emulsifier, a ribbon blender or the like. It is necessary that relatively low temperatures, i.e., well below the flow temperatures of either the polyhalogenated copolymer or the binder polymer, be employed both during solvent vaporization and during mixing in order to ensure that the microparticles are not fused or solubilized, i.e., that the polyhalogenated copolymer particles maintain their essentially particulate nature. In fact, it is necessary that the polyhalogenated copolymer particles maintain their full particulate nature until they are calendered or heated. If the particulate nature of the polyhalogenated copolymer microparticles is destroyed then the unique, uniform, small sized, pores of the instant invention are not achieved in the final film.

Following preparation of the polyhalogenated copolymer/binder polymer blend, in order to prevent contamination or solvent loss the solution/dispersion should be sealed.

In addition, throughout the entirety of the process described herein, it is necessary that each step be carried out in a clean, dust free environment, otherwise, dust or dirt particles may introduce undesirable flaws in the microporous films of the instant invention.

After preparation of the above casting solution/dispersion or dope, a film is formed from the solution/dispersion. The viscosity of the casting solution or dope and thereby the solids content of the casting solution or dope is chosen depending upon the type of film formation process which is utilized. Where a simple casting procedure is employed, i.e., where the solution/dispersion is simply poured onto a temporary substrate and spread with a casting device such as a knife, lower viscosity, lower solids casting solutions are chosen, of course taking into account the binders and solvents which are selected and following procedures well known an the art. Again, the ultimate viscosity of the extrusion dope is chosen depending upon the particular extrusion equipment which is employed according to procedures well known in the art. Regardless of whether the film is cast or extruded, it is essential that relatively low temperatures—well below the low temperature of either the binder polymer or the polyhalogenated copolymer be chosen, for the reasons explained above.

Regardless of whether the film is cast or extruded the film will be formed onto a substrate utilizing procedures well known in the art. While glass, metal or plastic substrates may be used, silicone coated paper is particularly preferred.

After the film is cast or extruded, the solvent/dispersing medium is evaporated by drying using conventional methods. Again, however, the temperature which is chosen must be well below the flow temperature of either the binder polymer or the polyhalogenated copolymer. For example, where the polyhalogenated copolymer and the binder polymer have flow temperatures of about 250°-275° C., it is preferred that temperatures no higher than about 225° C., preferably no higher than about 200° C. be employed.

The films which are formed according to the process of the instant invention can have an initial thickness of up to about 5 to 10 mils, preferably two to five mils although thinner or thicker films may be formed using the process described herein.

After the film has been formed and the solvent evaporated, it is necessary that the film be heat treated, preferably by calendering in order to cause irreversible, partial, agglomeration of the microparticles of the polyhalogenated copolymer described herein. By partial, irreversible agglomeration, it is meant that the microparticles which are in contact with each other will, at the point of contact, neck over or flow into an adjacent microparticle. However, the individual microparticles will still have a discernable particulate shape remaining in those areas where there has been no necking or direct particle flow. If full coalescence or melting of the microparticles of polyhalogenated copolymer occurs then the films prepared according to the instant invention will not have the uniqe microporous character defined above.

It is also necessary that any heating which occurs be uniform in nature. In the event that heating is non-uniform and results in the film having both hot and cold spots, in the cold spots—the spots where heating above the melting point of the polyhalogenated copolymer does not occur—the final film may lack film integrity. And in those locations where the film was too hot and where the microparticles completely coalesced, and did not simply neck over only at points of immediately adjacent contact, the final film will have no microporous character.

In general the temperature which is chosen for heating or calendering should be at or slightly above, i.e., up to 15° C. above, the melting point or flow temperature of the polyhalogenated copolymer. The time during which the film should be heated at this temperature will vary depending upon the degree of microporous character which i desired in the final film. Where great porosity is desired lesser heating is employed. In general, heating should be for periods in the range of up to about five minutes or for a long enough period of time to assure that the microparticles partially irreversible agglomerate. The degree of exposure will also depend upon the film thickness, with thicker films requiring great exposure to heat. Heating may be carried out by microwave, by radiant heat or by any other source of heat. However, it is essential that the heating be uniform in order to assure uniform film characteristics as explained above. Preferably, heat is supplied by a heated roll and most preferably heating in carried out in conjunction with pressure, i.e., through a calendering process or a convergent die.

Calendering pressure and conditions will depend upon the nature of the film being treated, the nature of the film desired, the properties of the film and other factors. With increased pressure, generally, the porosity of the final microporous film decreases. In the usual case, calendering is carried out at compression pressures in the range of about 500 to 2000 pounds per linear inch. Exposure to the calendering roll is usually carried out for time periods ranging from fractions of a second to several seconds. Typical calendering roll treatment speeds can be about one-half to five meters per minute or higher. The compression ratio which is defined as a ratio of the thickness of the as-formed film to the thickness of the film after calendering may vary. However, preferably, the compression ratio should not exceed about 2.

The calendered film is then treated with a solvent which will dissolve and extract virtually all of the binder polymer. Typically, no more than about five percent, preferably no more than about 1.5 percent of the binder polymer is left behind, after extraction. If higher levels of the binder polymer are left behind after extraction, the binder polymer which remains may leach out or may degrade in the corrosive atmosphere in which the polyhalogenated copolymer films of the instant invention are designed to operate. Extraction may be carried out according to methods well known in the art for forming microporous membranes. For example, the film of the instant invention may simply be immersed in a bath of the bleaching solvent and left in the bath until the binder polymer is dissolved. Instead of employing a batch method, it is possible to employ a continuous method utilizing a counter current multistaged method of polymer extraction.

The solvents which are useful for extraction include any solvents in which the binder polymer is soluble but the polyhalogenated copolymer is insoluble. In general, the extraction solvent will be the same as the solvent in which the binder polymer was dissolved before blending with the polyhalogenated copolymer.

After the extraction process is completed the film is dried and stored for use.

The microporous films of the instant invention have good porosities and are essentially free from pinholes. In general, the films of the instant invention will have porosities of up to about 65 percent, preferably about 30 to about 60 percent and most preferably about 45 to about 55 percent. As pointed out above, the pore surface diameter range of the films of the instant invention is narrow, i.e., at least 50 percent, preferably at least 67 percent and, most preferably, at least 75 percent of the pores will be within 0.7 and preferably no more than 0.5 microns of each other with overall average pore diameters being less than about 1.0 microns, preferably less than about 0.5 microns. The mean pore surface diameter of the films of the instant invention is determined by use of an electron microscope.

EXAMPLES

EXAMPLE 1

An aqueous dispersion of an ETFE, approximately equimolar, ethylene/tetrafluoroethylene copolymer dispersed at the 12 percent solids level in water, manufactured by the Hoechst Corporation under the trade name Hostaflon ®, and having a particle size range of about 0.2 to 0.3 microns was obtained. The molecular weight of the material was relatively high and its melt index was 0. The dispersion contained 0.2 percent by weight based on the total dispersion weight of ammonium perfluoroctanoate, 0.1 weight percent ammonium oxalate and 0.03 weight percent maganese acetate.

The surfactants were removed from the dispersion by adding a large volume of acetone which caused separation of the ETFE polymer from the dispersing medium. The entire mixture was centrifuged and the acetone/water mixture was decanted. This procedure was employed three additional times followed by four methylene chloride washes. Following the final wash, sufficient methylene chloride was added to the ETFE to produce a 20 weight percent solids dispersion of the ETFE polymer in methylene chloride.

A polycarbonate solution at the 20 percent by weight in methylene chloride was prepared by dissolving, at room temperature under moderate tumbling, pellets f a polycarbonate available from Mobay Corporation having the trade name of Merlon HMS 3118. Both the ETFE dispersion and the polycarbonate solution were stable.

70 parts by weight of the ETFE dispersion were mixed with 30 parts by weight of the polycarbonate solution under high shear and the resulting blend was then filtered, under nitrogen, through stainless steel screens having meshes, respectively, of 100, 150, 250 and 400. The resulting blend or dope exhibited a total solids content of 20 percent by weight in the methylene chloride.

Casting was carried out by pouring the dope onto a silicone coated paper, spreading the dope to the desired film thickness with a casting knife, covering the cast film and allowing the film to air dry to produce a film of 75 microns thickness.

The dried film was then calendered at a temperature of 300° C. and a pressure of 1000 pounds per linear inch in a 10 inch diameter calender. The roll speed of the calender was 1 meter/minute and the compression ratio was 1.5 to one. Following calendering the film was immersed in a mthylene chloride bath for 20 minutes in order to leach out residual polycarbonate polymer.

A visual analysis of the film prepared in this example was carried out by electron microscope. The results are shown in FIGS. 1 and 3. A similar visual analysis by electron microscope was carried out on a Rayperm ® 40 percent void volume microporous, ETFE film. The results are shown in FIGS. 2 and 4. As can be seen, the microporous films of the instant invention are of smaller, more uniform and rounder pore size than is the Rayperm ® film.

An image analysis of the surface pore size distribution of the film prepared in this example was carried out. The pore size distribution was extremely narrow with 84.4 percent of the pores ranging from 0.15 to 0.45 microns in diameter.

Utilizing x-ray fluorescence, an analysis was performed on the surface of the Rayperm ® film and the film of the instant invention prepared as described above. The Rayperm ® film contained significant discennable amounts of sodium, silicon, sulfur, chlorine and potassium. The film of the instant invention sowed the presence only of silicon.

The porosity of the film prepared in this example was analyzed using a Gurley Densometer and compared to the porosity of the Rayperm ® microporous film described above. As shown in Table 1 below, the film of the instant invention had a porosity which was equal or superior to that of the Rayperm ® material. Likewise, the pore size distribution for the material of this invention was far superior to either the 40 percent or the 60 percent void volume Rayperm ® microporous film.

The transverse direction mechanical properties of the microporous film prepared in this example were compared to those of the Rayperm ® film with the results shown in Table 2. As can been seen the transverse direction tensile strength of the film prepared according to the instant invention is far superior to that of the prior art, Rayperm microporous film.

The membrane prepared in this example was evaluated for chemical resistance by immersion in thionyl chloride/2M $LiAlCl_4$ at 70° C. for one month and compared with a similarly exposed example of the Rayperm ® film. While the film of this example was slightly yellowed, the internal microporous structure remained intact and exhibited no visible changes. The film of this example also showed a lesser loss of mechanical properties after exposure as compared to the prior art Rayperm ® film.

Moreover, the film prepared in the instant invention is isotropic in nature while the Rayeerm ® film, which is typical of prior art, microporous films, is anisotropic in nature.

A sample of the film prepared in this example was employed as a battery separator in a lithium AA rechargeable battery. The battery was charged and discharged at 100 MA for 50 cycles. The membrane performed well. Good results were also obtained using this film as a separator in a lithium nonrechargeable battery.

EXAMPLE 2

Example 1 was repeated except that the amounts of polycarbonate were varied from 10 to 70 percent. The 10 percent polycarbonate films would not bind the ETFE powders and, therefore, after solvent evaporation the film disintegrated. The 20 percent polycarbonate film was flakey and disintegrated. Other films are shown in Table 3. As can be seen, as the percentage of ppolycarbonate increases the porosity likewise increases substantially.

EXAMPLE 3

Example 1 was repeated except that a Tefzel powder available from the du Pont Corporation having a particle size of about 42 microns was employed in place of the ETFE powder used in Example 1. The resulting films were nonporous.

EXAMPLE 4

Example 1 was repeated except that polymethylmethacrylate having an extremely high molecular weight was employed in place of the polycarbonate. Also, instead of methylene chloride, methylethyl ketone was employed as the solvent/dispersant. A 70/30 ETFE/polymethylmethacrylate film was cast, calendered and extracted as specified in Example 1. The resulting film exhibied properties similar to those of the film of Example 1.

TABLE 1

|  | Example 1 | Rayperm 40% Void Volume | Rayperm 60% Void Volume |
|---|---|---|---|
| Thickness (Micron) | 40-55 | 42 | 62 |

TABLE 1-continued

| | Example 1 | Rayperm 40% Void Volume | Rayperm 60% Void Volume |
|---|---|---|---|
| Void (%) | 50–60 | 40 | 60 |
| Gurley (sec) | 5–7 | 25–40 | 6–10 |
| Pore Size (Micron) | | | |
| Surface | 0.1–1 | 1–5 | 1–5 |
| Cross-section | 0.1–1 | 1–5 | 1–5 |
| Mechanical Property | Isotropic | Anisotropic | Very Anisotropic |

TABLE 2

| Material | Tensile Strength (Psi) | Elongation (%) | Modulus (KPsi) |
|---|---|---|---|
| Example 1 | 1760 | 20 | 32.5 |
| Rayperm 40% Void Volume | 1265 | 20.5 | 13.5 |
| Rayperm 60% Void Volume | 508 | 18.6 | 5.8 |

TABLE 3

Gurley Numbers Of Various ETFE/PC Membranes

| Example | ETFE/PC | Thickness (micron) | Gurley (s) |
|---|---|---|---|
| 2a | 80/20 | 40–51 | 26–34 |
| 1 | 70/30 | 38–51 | 7–8.8 |
| 2b | 60/40 | 45–62 | 1.3–1.6 |
| 2c | 50/50 | 46–55 | 0.7–0.75 |
| 2d | 40/60 | 65–70 | 0.2–0.4 |
| 2e | 30/70 | 50–54 | 0.2–0.5 |

What is claimed:

1. An essentially ion-free, microporous film having improved transverse direction strength, when compared to prior art films, formed from polyhalogenated copolymers containing moieties having the formulae —$(C_a H_{2a})$— and —$(C_b X_{2b})$—, wherein a is 1–6 and b is 1–6 and X is fluorine or chlorine, or mixtures thereof, and wherein said film is formed from partially irreversibly coalesced micropowders of said copolymers wherein said micropowders have a particle size of less than about 1.5 microns and wherein said powders substantially retain their powder character except at points of necking between powder particles, and wherein said film has a mean pore size diameter of less than about 1 micron, a porosity of less than about 65 percent and wherein at least about 50 percent of the surface pore diameters of pores of the film are within at least about 0.7 microns of each other.

2. The film of claim 1 wherein the polymer is selected from the group consisting of ethylene tetrafluoroethylene and ethylene chlorotrifluoroethylene copolymers and mixtures thereof.

3. The film of claim 2 wherein the polymer is an ethylene-tetrafluoroethylene copolymer.

4. The film of claims 1 or 3 wherein the pore diameter ranges from about 0.1 to about 1.0 microns.

5. The film of claims 1 or 3 wherein the mean pore size diameter is about 0.1 to about 0.4 microns.

6. An essentially ion-free, microporous, battery separator having improved transverse direction strength, when compared to prior art separators, formed from polyhalogenated copolymers containing moieties having the formulae —$(C_a H_{2a})$— and —$(C_b X_{2b})$—, wherein a is 1–6 and b is 1–6 and X is fluorine or chloine, or mixtures thereof, and wherein said separator is formed from partially irreversibly coalesced micropowders of said copolymers wherein said micropowders save a particle size of less than about 1.5 microns and wherein said powders substantially retain their powder character except at points of necking between powder particles, and wherein said separator has a mean pore size diameter of less than about 1 micron, a porosity of less than about 65 percent and wherein at least about 50 percent of the surface pore diameter of the pores of the separator are within at least about 0.7 microns of each other.

7. The separator of claim 6 wherein the polymer is selected from the group consisting of ethylene tetrafluoroethylene and ethylene chlorotrifluoroethylene copolymers and mixtures thereof.

8. The separator of claim 6 wherein the polymer is an ethylene- tetrafluoroethylene copolymer.

9. The separator of claims 6 or 8 wherein the pore diameter ranges from about 0.1 to about 1.0 microns.

10. The separator of claims 6 or 8 wherein the mean pore size diameter is about 0.1 to about 0.4 microns.

11. An essentially ion-free microporous rechargeable battery separator having improved transverse direction strength, when compared to prior art separators, formed from polyhalogenated copolymers containing moieties having the formulae —$(C_a H_{2a})$— and —$(C_b X_{2b})$—, wherein a is 1–6 and b is 1–6 and X is fluorine or chlorine, or mixtures thereof, and wherein said separator is formed from partially irreversibly coalesced micropowders of said copolymers wherein said micropowders have a particle size of less than about 1.5 microns and wherein said powders substantially retain their powder character except at points of necking between powder particles, and wherein said separator has a mean pore size diameter of less than about 1 micron, a porosity of less than about 65 percent and wherein at least about 50 percent of the surface pore diameters of the pores of the separator are within at least about 0.7 microns of each other.

12. The separator of claim 11 wherein the polymer is selected from the group consisting of ethylene tetrafluoroethylene and ethylene chlorotrifluoroethylene copolymers and mixtures thereof.

13. The separator of claim 11 wherein the polymer is an ethylene- tetrafluoroehylene copolymer.

14. The separator of claims 11 or 13 wherein the pore diameter ranges from about 0.1 to about 1.0 microns.

15. The separator of claims 11 or 13 wherein the mean pore size diameter is about 0.1 to about 0.4 microns.

* * * * *